(12) United States Patent
Vawter et al.

(10) Patent No.: US 12,214,724 B2
(45) Date of Patent: *Feb. 4, 2025

(54) SYSTEMS AND METHODS FOR DEPLOYING WARNING DEVICES FROM AN AUTONOMOUS VEHICLE

(71) Applicant: Aurora Operations, Inc., Pittsburgh, PA (US)

(72) Inventors: Zac Vawter, Sunnyvale, CA (US); Alden James Woodrow, Oakland, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,278

(22) Filed: Jun. 17, 2022

(65) Prior Publication Data
US 2022/0317690 A1 Oct. 6, 2022

Related U.S. Application Data

(63) Continuation of application No. 15/890,383, filed on Feb. 7, 2018, now Pat. No. 11,366,476.
(Continued)

(51) Int. Cl.
*B60Q 1/46* (2006.01)
*B60Q 1/50* (2006.01)
(Continued)

(52) U.S. Cl.
CPC ............. *B60Q 7/00* (2013.01); *B60Q 1/507* (2022.05); *B60Q 1/525* (2013.01); *G05D 1/0214* (2013.01); *G05D 1/0274* (2013.01)

(58) Field of Classification Search
CPC ............... G05D 1/0214; G05D 1/0274; G05D 2201/0213; B60Q 7/00; B60Q 1/46; B60Q 1/50; B60Q 1/525
(Continued)

(56) References Cited

U.S. PATENT DOCUMENTS 6,081,188 A 6/2000 Kutlucinar et al.
7,395,776 B2 7/2008 Harruna
(Continued)

*Primary Examiner* — Rachid Bendidi
*Assistant Examiner* — Hossam M Abd El Latif
(74) *Attorney, Agent, or Firm* — Dority & Manning, P.A.

(57) ABSTRACT

Systems and methods are directed to deploying warning devices by an autonomous vehicle. In one example, a system includes one or more processors and memory including instructions that, when executed by the one or more processors, cause the one or more processors to perform operations. The operations include obtaining data indicating that a vehicle stop maneuver is to be implemented for an autonomous vehicle. The operations further include determining whether one or more warning devices should be dispensed from the autonomous vehicle during the vehicle stop maneuver based in part on the obtained data. The operations further include, in response to determining one or more warning devices should be dispensed from the autonomous vehicle, determining a dispensing maneuver for the one or more warning devices, and providing one or more command signals to one or more vehicle systems to perform the dispensing maneuver for the one or more warning devices.

20 Claims, 5 Drawing Sheets

Related U.S. Application Data

(60) Provisional application No. 62/617,409, filed on Jan. 15, 2018.

(51) Int. Cl.
    *B60Q 7/00*          (2006.01)
    *G05D 1/00*          (2024.01)

(58) Field of Classification Search
    USPC .......................................................... 701/23
    See application file for complete search history.

(56) References Cited

U.S. PATENT DOCUMENTS

| | | | |
|---|---|---|---|
| 2005/0081413 A1 | 4/2005 | Ko | |
| 2010/0134271 A1 | 6/2010 | Edwards et al. | |
| 2011/0298638 A1* | 12/2011 | Groeneweg | G08G 1/096775 |
| | | | 340/905 |
| 2012/0091252 A1* | 4/2012 | Zatterqvist | F41H 11/02 |
| | | | 244/3.1 |
| 2015/0116102 A1* | 4/2015 | Takahashi | G08B 5/38 |
| | | | 340/435 |
| 2016/0060822 A1* | 3/2016 | Kanerva | H04N 7/181 |
| | | | 404/84.05 |
| 2016/0351050 A1* | 12/2016 | Takahara | G08G 1/0968 |
| 2017/0008455 A1* | 1/2017 | Goudy | G08G 1/097 |
| 2017/0101093 A1 | 4/2017 | Barfield, Jr. et al. | |
| 2017/0221362 A1* | 8/2017 | Gunaratne | G08G 1/166 |
| 2017/0297482 A1* | 10/2017 | Salter | F21S 43/14 |
| 2017/0297569 A1 | 10/2017 | Nilsson et al. | |
| 2017/0322558 A1* | 11/2017 | Teshima | G07C 5/008 |
| 2018/0186283 A1* | 7/2018 | Fischer | G07C 5/008 |
| 2018/0190042 A1* | 7/2018 | Gordon | B64C 39/024 |
| 2019/0056747 A1* | 2/2019 | Govindaraj | G06K 9/6256 |

* cited by examiner

SYSTEMS AND METHODS FOR DEPLOYING WARNING DEVICES FROM AN AUTONOMOUS VEHICLE

PRIORITY CLAIM

The present application is a continuation of U.S. application Ser. No. 15/890,383 having a filing date of Feb. 7, 2018, which claims the benefit of of U.S. Provisional Application 62/617,409 filed January nce herein. Applicant claims priority to and the benefit of each of such applications and incorporates all such applications herein by reference in its entirety.

FIELD

The present disclosure relates generally to operation of an autonomous vehicle. More particularly, the present disclosure relates to systems and methods that provide for deploying warning devices by an autonomous vehicle.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

SUMMARY

Aspects and advantages of embodiments of the present disclosure will be set forth in part in the following description, or can be learned from the description, or can be learned through practice of the embodiments.

One example aspect of the present disclosure is directed to a system. The system includes one or more processors and one or more memories including instructions that, when executed by the one or more processors, cause the one or more processors to perform operations. The operations include obtaining data indicating that a vehicle stop maneuver is to be implemented for an autonomous vehicle. The operations further include determining whether one or more warning devices should be dispensed from the autonomous vehicle during the vehicle stop maneuver based in part on the obtained data. The operations further include in response to determining one or more warning devices should be dispensed from the autonomous vehicle, determining a dispensing maneuver for the one or more warning devices. The operations further include providing one or more command signals to one or more vehicle systems to perform the dispensing maneuver for the one or more warning devices.

Another example aspect of the present disclosure is directed to a computer-implemented method for deployment of a warning device. The method includes obtaining, by a computing system comprising one or more computing devices, data indicating that a vehicle stop maneuver is to be implemented for an autonomous vehicle. The method further includes determining, by the computing system, whether one or more warning devices should be dispensed from the autonomous vehicle during the vehicle stop maneuver based in part on the obtained data. The method further includes in response to determining one or more warning devices should be dispensed from the autonomous vehicle, determining, by the computing system, a dispensing maneuver for the one or more warning devices. The method further includes providing, by the computing system, one or more command signals to one or more vehicle systems to perform the dispensing maneuver for the one or more warning devices.

Another example aspect of the present disclosure is directed to an autonomous vehicle. The autonomous vehicle includes a vehicle computing system. The vehicle computing system includes one or more processors; and one or more memories including instructions that, when executed by the one or more processors, cause the one or more processors to perform operations. The operations include obtaining data indicating that a vehicle stop maneuver is to be implemented for an autonomous vehicle. The operations further include determining whether one or more warning devices should be dispensed from the autonomous vehicle during the vehicle stop maneuver based in part on the obtained data. The operations further include in response to determining one or more warning devices should be dispensed from the autonomous vehicle, determining a dispensing maneuver for the one or more warning devices. The operations further providing one or more command signals to one or more vehicle systems to perform the dispensing maneuver for the one or more warning devices.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
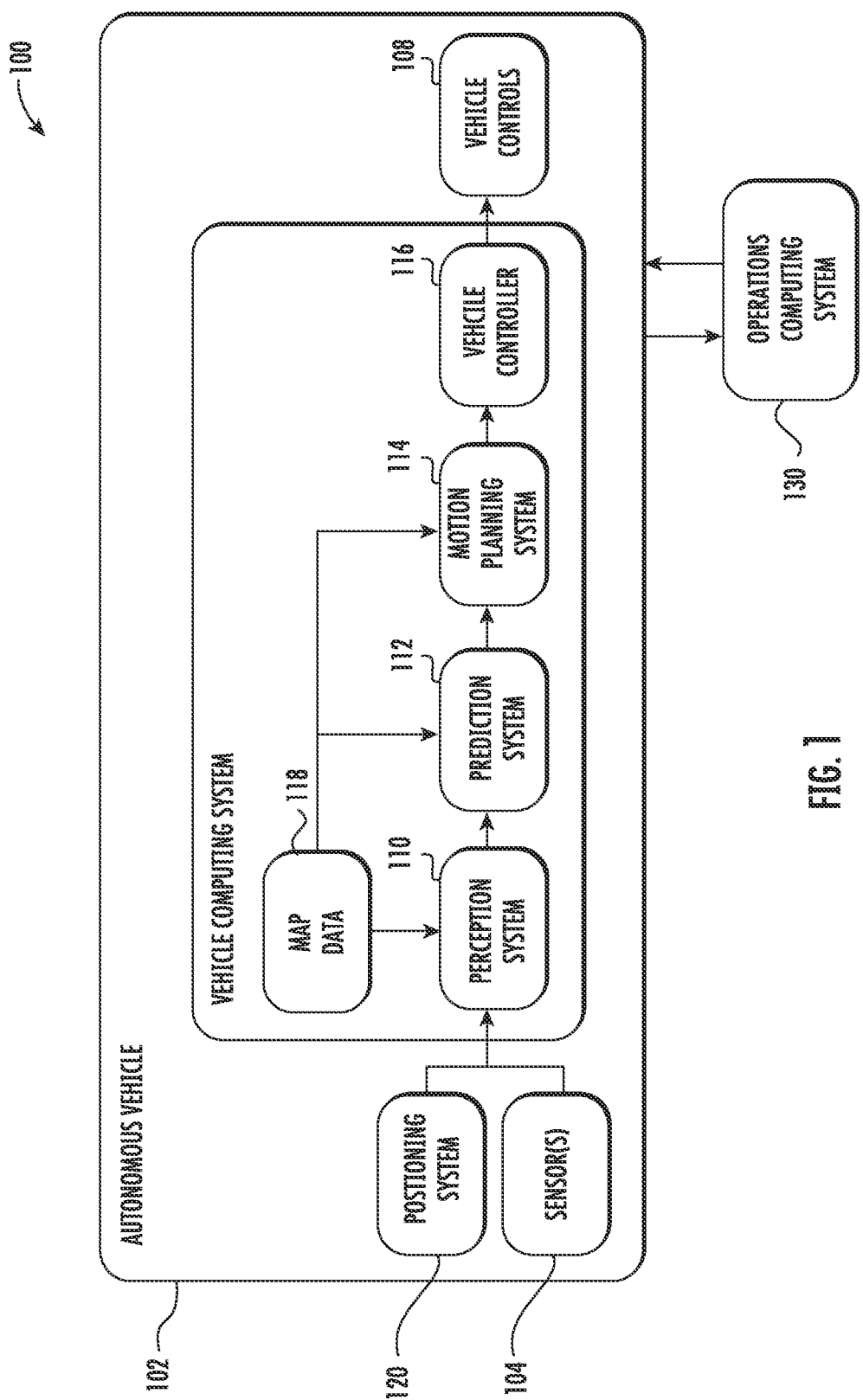
FIG. 1 depicts a block diagram of an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to dispensing warning devices outside of an autonomous vehicle (e.g., behind the vehicle and/or in or near a travel lane) in particular situations, such as while stopping motion of the autonomous vehicle after detection of a fault. In particular, the systems and methods of the present disclosure can provide for determining that a procedure to stop the motion of an autonomous vehicle is to be implemented and determining whether one or more warning devices (e.g., flares, safety triangles, cones, lights, etc.) should be deployed by the autonomous vehicle (e.g., physically ejected from) to warn others of the stopped autonomous vehicle. The systems and methods of the present disclosure can enable an autonomous vehicle to determine an appropriate timing of warning device deployment and/or to adjust the stop trajectory of the vehicle to affect placement of the warning device(s). In this way, the systems and methods of the present disclosure can optimize visibility of the warning device(s), thereby increasing the safety of the autonomous vehicle, its passengers, as well as objects within its surroundings.

In particular, according to an aspect of the present disclosure, an onboard autonomous vehicle computing system may detect a fault that would necessitate stopping the autonomous vehicle within or near a travel lane. The computing system can determine a stop trajectory for safely stopping the autonomous vehicle and also determine whether the autonomous vehicle is to deploy one or more warning devices based on the detected fault and/or environment conditions (e.g., location and trajectories of nearby traffic, weather, time of day, road conditions, and one or more of the like conditions).

The computing system can determine a deployment action or maneuver ("deployment maneuver") based on the stop trajectory, e.g., to enable the autonomous vehicle to dispense the warning device(s) in a manner that increases the visibility of the warning device(s). The deployment maneuver, as used herein, can correspond to one or more of a number of aspects of deploying the warning device(s). This can include, for example, timing the deployment and/or determining the rate of release of the warning device(s) based on the stopping distance of the vehicle (e.g., timing deployment to begin 50 feet, etc. before vehicle stops), the vehicle trajectory, environment, and/or the like. Additionally, in some cases, a computing system can modify the stop trajectory for the autonomous vehicle to affect the positioning of the warning device(s), for example, by taking into account road elevation, surface characteristics (e.g., friction, sliding, etc.), road conditions, and/or the like. Additionally, in some cases, a motion planner can determine the stop trajectory in conjunction with the deployment maneuver as an integrated operation.

More particularly, an autonomous vehicle (e.g., a ground-based vehicle, air-based vehicle, or other vehicle type) can include a variety of systems onboard the autonomous vehicle to control the operation of the vehicle. For instance, the autonomous vehicle can include one or more data acquisition systems (e.g., sensors, image capture devices), one or more vehicle computing systems (e.g. for providing autonomous operation), one or more vehicle control systems, (e.g., for controlling acceleration, braking, steering, etc.), and/or the like. The data acquisition system(s) can acquire sensor data (e.g., LIDAR data, radar data, image data, etc.) associated with one or more objects (e.g., pedestrians, vehicles, etc.) that are proximate to the autonomous vehicle and/or sensor data associated with the vehicle path (e.g., path shape, boundaries, markings, etc.). The sensor data can include information that describes the location (e.g., in three-dimensional space relative to the autonomous vehicle) of points that correspond to objects within the surrounding environment of the autonomous vehicle (e.g., at one or more times). The data acquisition system(s) can provide such sensor data to the vehicle computing system.

In addition to the sensor data, the vehicle computing system can obtain map data that provides other detailed information about the surrounding environment of the autonomous vehicle. For example, the map data can provide information regarding: the identity and location of various roadways, road segments, buildings, or other items; the location and direction of traffic lanes (e.g. the boundaries, location, direction, etc. of a travel lane, parking lane, a turning lane, a bicycle lane, and/or other lanes within a particular travel way); traffic control data (e.g., the location and instructions of signage, traffic signals, and/or other traffic control devices); and/or any other map data that provides information that can assist the autonomous vehicle in comprehending and perceiving its surrounding environment and its relationship thereto.

The vehicle computing system can include one or more computing devices and include various subsystems that can cooperate to perceive the surrounding environment of the autonomous vehicle and determine a motion plan for controlling the motion of the autonomous vehicle. For instance, the vehicle computing system can include a perception system, a predication system, and a motion planning system. The vehicle computing system can receive and process the sensor data to generate an appropriate motion plan through the vehicle's surrounding environment.

The perception system can detect one or more objects that are proximate to the autonomous vehicle based on the sensor data. In particular, in some implementations, the perception system can determine, for each object, state data that describes a current state of such object. As examples, the state data for each object can describe an estimate of the object's: current location (also referred to as position); current speed/velocity; current acceleration; current heading; current orientation; size/footprint; class (e.g., vehicle class versus pedestrian class versus bicycle class, etc.); and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time, and thereby produce a presentation of the world around an autonomous vehicle along with its state (e.g., a presentation of the objects within a scene at the current time along with the states of the objects).

The prediction system can receive the state data from the perception system and predict one or more future locations for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object provided by the prediction system and/or the state data for the object provided by the perception system. Stated differently, given information about the classification and current locations of objects and/or predicted future locations of proximate objects, the motion planning system can determine a motion plan for the autonomous vehicle that best navigates the autonomous vehicle along the determined travel route relative to the objects at such locations. The motion plan can include one or more vehicle trajectories that indicate how the vehicle is to travel over a certain time period, distance, etc. This can indicate a vehicle heading, speed, acceleration, and/or other motion parameters. The motion planning system can be configured to select a vehicle trajectory for implementation by the autonomous vehicle to control its motion.

As one example, in some implementations, the motion planning system can determine a cost function for each of one or more candidate vehicle trajectories for the autonomous vehicle based at least in part on the current locations and/or predicted future locations of the objects. For example, the cost function can describe a cost (e.g., over time) of adhering to a particular candidate trajectory. For example, the cost described by a cost function can increase when the autonomous vehicle approaches impact with another object and/or deviates from a preferred pathway (e.g., a predetermined travel route).

Thus, given information about the classifications, current locations, and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control acceleration, steering, braking, etc.) to execute the selected motion plan.

In some implementations, the vehicle computing system can communicate with various data acquisition systems, autonomy systems, and/or vehicle control systems onboard the autonomous vehicle and obtain data indicative of one or more parameters associated with the vehicle. The vehicle computing system can be configured to determine the existence of a fault associated with the vehicle, for example, based in part on such parameter data. In some implementations, to address the existence of the fault, the vehicle computing system can determine one or more actions to be performed by the autonomous vehicle to stop of the motion of the vehicle. For example, the vehicle computing system can determine a trajectory and rate of deceleration to bring the vehicle to a stop and communicate the appropriate commands to implement the vehicle stop.

The systems and methods of the present disclosure can provide for recognizing that a vehicle stop procedure is to be implemented and determining whether one or more warning devices onboard the vehicle should be deployed as part of the vehicle stop procedure (e.g., begin dispensing the warning device(s) while the vehicle is still in motion). For example, in some implementations, a vehicle computing system can determine that the procedure will bring the vehicle to a stop within and/or near to a travel lane (e.g., based on fault severity, etc.) and determine that one or more warning devices should be deployed to provide warning that the vehicle will be stopping. Alternatively, for some vehicle stop procedures, such as where a motion plan brings the vehicle to a stop outside of a roadway (e.g., at a service location, a defined distance away for the roadway, etc.), the vehicle computing system may determine that warning device(s) should not be deployed.

According to an aspect of the present disclosure, the vehicle computing system can determine a maneuver for dispensing the one or more warning devices to optimize visibility. In some implementations, the vehicle computing system can determine how the warning device(s) should be dispensed based in part on the motion plan and/or trajectory being implemented to stop the vehicle. For example, the computing system can determine the timing for dispensing the warning device(s) based on the motion plan and/or trajectory such that the dispensing begins at a point in time when the vehicle is a certain distance from stopping. In some implementations, the vehicle computing system can adjust the stop trajectory to affect positioning of the warning device(s). For example, the vehicle computing system can take parameters such as road conditions, friction, sliding characteristics, and/or the like into account to adjust the stop trajectory and dispensing of the warning device(s) to affect positioning of the warning device(s) and/or optimize visibility of the warning device(s).

In some implementations, the vehicle computing system can determine the deployment of the one or more warning devices based in part on map data. For example, the vehicle computing system can determine lane boundaries and/or road elevations based on map data and optimize the deployment of the warning device(s) for maximum visibility behind the stopped autonomous vehicle. As one example, the vehicle computing system may determine that the stop trajectory will take the vehicle over a rise based on map data and determine that the dispensing of the warning device(s) should be timed to begin before cresting the rise. As another example, the vehicle computing system may determine that the stop trajectory will bring the vehicle to a stop around a curve in the travel way and determine that the dispensing of the warning device(s) should be timed to begin before the vehicle enters the curve. In some implementations, the vehicle computing system can determine a stop trajectory and warning device(s) deployment based on map data as well as taking into account other vehicles following the autonomous vehicle.

Additionally, or alternatively, the vehicle computing system can determine the deployment of the one or more warning devices based in part on acquired senor data. For example, the vehicle computing system can determine the curvature of a travel way, the position of walkways, etc. based on the sensor data acquired onboard the autonomous vehicle. The vehicle computing system can determine a stop trajectory and warning device(s) deployment based on the sensor data to ensure that the warning device(s) are positioned relative to the travel way, walkway, etc. in a manner that increases visibility of the warning device(s).

In some implementations, the vehicle computing system can provide for performing one or more actions to alert other vehicles (e.g., vehicle operators) that warning device(s) are to be deployed. For example, in some implementations, the vehicle computing system can communicate commands to one or more vehicle systems to activate and/or modify lights and/or displays (e.g., hazard warning lights, brake lights, other displays, etc.) to more prominently alert other vehicles (and/or associated operators) following the autonomous vehicle of the warning device(s) being dispensed. In some implementations, the vehicle computing system may perceive objects (e.g., other vehicles) proximate to the autonomous vehicle (e.g., approaching the vehicle from behind, etc.) and activate lights and/or modify a light blink pattern to alert the approaching drivers.

According to another aspect of the present disclosure, the warning device(s) to be dispensed by an autonomous vehicle can include one or more of safety flares, safety triangles, devices that include lights and/or LEDs (e.g., connected to a spool of wire, etc.), rope lights, and/or the like. In some implementations, the warning device(s) can be attached together, such as by rope, wire, etc., to allow for easier retrieval. In some implementations, the vehicle computing system can determine a maneuver for dispensing the warning device(s) based on the type of device. As an example, in the case of safety flares and/or safety triangles, the vehicle computing system can determine a point in time to begin dispensing the flares/triangles (e.g., an amount of time or distance before stopping, etc.) as well as how often to dispense the flares/triangles (e.g., interval between dispensing individual flares/triangles) to optimize visibility.

In some implementations, the warning device(s) can stay connected to the autonomous vehicle after the warning device(s) are dispensed (e.g., through physical connection). For example, the warning device(s) may include a spool of wire with attached flashing LEDs positioned onboard the autonomous vehicle. The spool of wire can include a weighting mechanism to allow for unspooling the wire for deployment of the LEDs. The vehicle computing system can communicate with a control for the spool to allow for deployment. In some implementations, the spool of wire can be powered by the autonomous vehicle and/or can include a separate power source. In some implementations, the spool of wire can have a predetermined length that can be fully released or released proportional to the vehicle speed. In some implementations, the vehicle computing system can determine a deployment of the LED wire that provides for directing traffic around the stopped vehicle. In some implementation, the autonomous vehicle may have a wireless communication connection with the warning device(s) after the warning device(s) are dispensed. In some implementations, the warning device(s) can be disconnected (e.g., physically disconnected, wirelessly disconnected) from the autonomous vehicle after the warning device(s) are dispensed.

In some implementation, the autonomous vehicle can control the placement of the warning device(s) after they have been dispensed. For example, the warning device(s) may include a spool of an inflatable line that when inflated has a predetermined shape. As such, during operation, the autonomous vehicle inflates the line to achieve the predetermined shape. Such a shape is to cause proper placement of the warning device(s) behind the vehicle. An example of a predetermined shape includes a shape that the line starts on one side of the vehicle and lays towards the other side of the vehicle at the distal end of the line. Additionally or alternatively, the autonomous vehicle can include an outrigger structure that moves the proximal end of the line in a way to achieve a shape of the released line.

In some implementations, the speed of the autonomous vehicle may be taken into account when determining whether warning device(s) should be deployed. For example, the vehicle computing system can determine that the vehicle is not traveling fast enough to allow for effective deployment of the warning device(s). In some implementations, other parameters (e.g., vehicle parameters, environment, road conditions, etc.) may be taken into account when determining whether warning device(s) should be deployed.

In some implementations, the autonomous vehicle may be a tractor-trailer truck and the warning device(s) may be positioned on the tractor portion. In such implementations, the warning device(s) may be configured such that the trailer portion of the truck can drive over the warning device(s).

The systems and methods described herein provide a number of technical effects and benefits. For instance, the vehicle computing system can locally control deployment of warning device(s) in an intelligent manner without having to communicate with a remote operations computing system or operator. Furthermore, the systems and methods described herein can provide for improved deployment of warning device(s) in a timely manner thereby optimizing warnings to other drivers and improving road safety.

With reference to the figures, example embodiments of the present disclosure will be discussed in further detail.

FIG. 1 depicts a block diagram of an example system 100 for controlling the navigation of an autonomous vehicle 102 according to example embodiments of the present disclosure. The system 100 can include a vehicle computing system 106 associated with the autonomous vehicle 102. In some implementations, the system 100 can include an operations computing system 130 that is remote from the autonomous vehicle 102.

The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode, semi-autonomous operational mode, and/or a non-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can include one or more computing devices and include various subsystems that can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

Additionally, in some implementations, the vehicle computing system 106 can communicate with various data acquisition systems, autonomy systems, and/or vehicle control systems onboard the autonomous vehicle and obtain data indicative of one or more parameters associated with the vehicle. The vehicle computing system can be configured to determine the existence of a fault associated with the vehicle, for example, based in part on such parameter data. The vehicle computing system 106 can determine one or more actions to be performed by the autonomous vehicle to address the existence of the fault.

In some implementations, vehicle computing system 106 can include a positioning system 120. The positioning system 120 can determine a current position of the autonomous vehicle 102. The positioning system 120 can be any device or circuitry for analyzing the position of the autonomous vehicle 102. For example, the positioning system 120 can determine position by using one or more of inertial sensors, a satellite positioning system, based on IP address, by using triangulation and/or proximity to network access points or other network components (e.g., cellular towers, WiFi access points, etc.) and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR system, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR system, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travel ways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that within the surrounding environment of the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; uncertainties associated therewith, and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that within the surrounding environment of the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. For example, the prediction system 112 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction system 112 predict the speed and/or acceleration at which the respective object is predicted to travel along its associated predicted motion trajectory. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations. The motion plan can include one or more vehicle trajectories that indicate how the vehicle 102 is to travel over a certain time period, distance, etc. This can indicate a vehicle heading, speed, acceleration, and/or other motion parameters. The motion planning system 114 can be configured to select a vehicle trajectory for implementation by the autonomous vehicle 102 to control its motion.

As one example, in some implementations, the motion planning system 114 can determine a cost function for each of one or more candidate vehicle trajectories for the autonomous vehicle 102 based at least in part on the current locations and/or predicted future locations of the objects. For example, the cost function can describe a cost (e.g., over time) of adhering to a particular candidate trajectory. For example, the cost described by a cost function can increase when the autonomous vehicle 102 approaches a possible impact with another object and/or deviates from a preferred pathway (e.g., a predetermined travel route).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

In some implementations, the autonomous vehicle 102 can be associated with an entity (e.g., a service provider, owner, manager). The entity can be one that offers one or more vehicle service(s) to a plurality of users via a fleet of vehicles that includes, for example, the autonomous vehicle 102. In some implementations, the operations computing system 130 can be associated with the entity. The entity can utilize the operations computing system 130 to coordinate and/or manage the autonomous vehicle 102 (and its associated fleet, if any) to provide the vehicle services to users.

The operations computing system 130 can include one or more computing devices that are remote from the autonomous vehicle 102 (e.g., located off-board the vehicle 102). For example, such computing device(s) can be components of a cloud-based server system and/or other type of computing system that can communicate with the vehicle computing system 106 of the autonomous vehicle 102. The computing device(s) of the operations computing system 130 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system 130 (e.g., the one or more processors, etc.) to perform operations and functions, such as providing data to and/or receiving data from the autonomous vehicle 102, for managing a fleet of vehicles (that includes the autonomous vehicle 102), etc.

Figure 2:
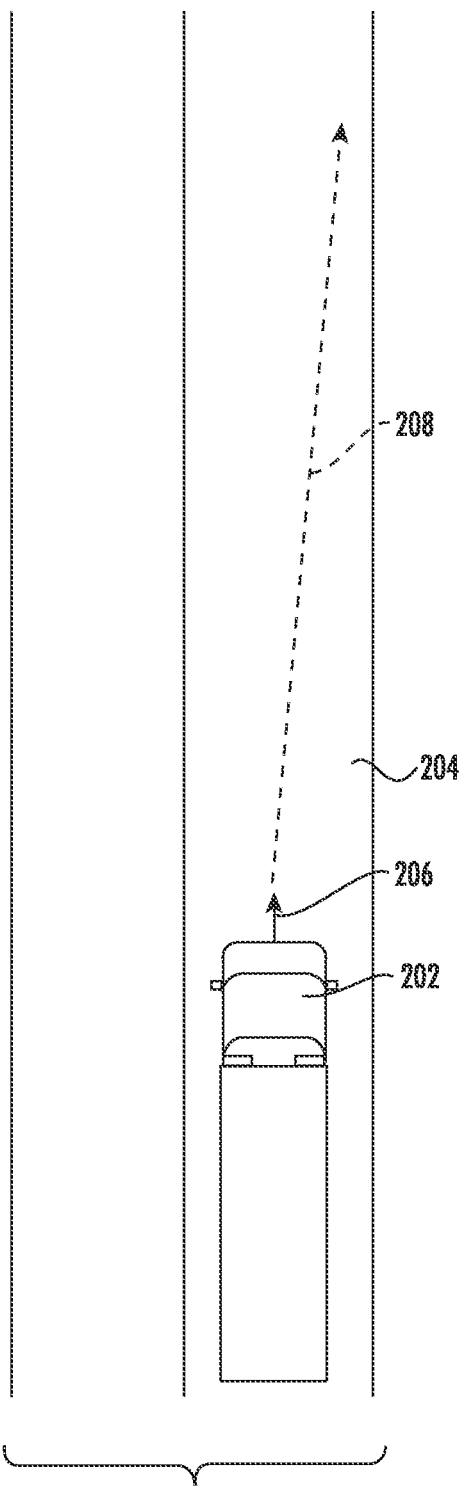
FIG. 2 depicts an autonomous vehicle moving in a travel lane before beginning deployment of warning device(s) according to example embodiments of the present disclosure.
Figure 3:
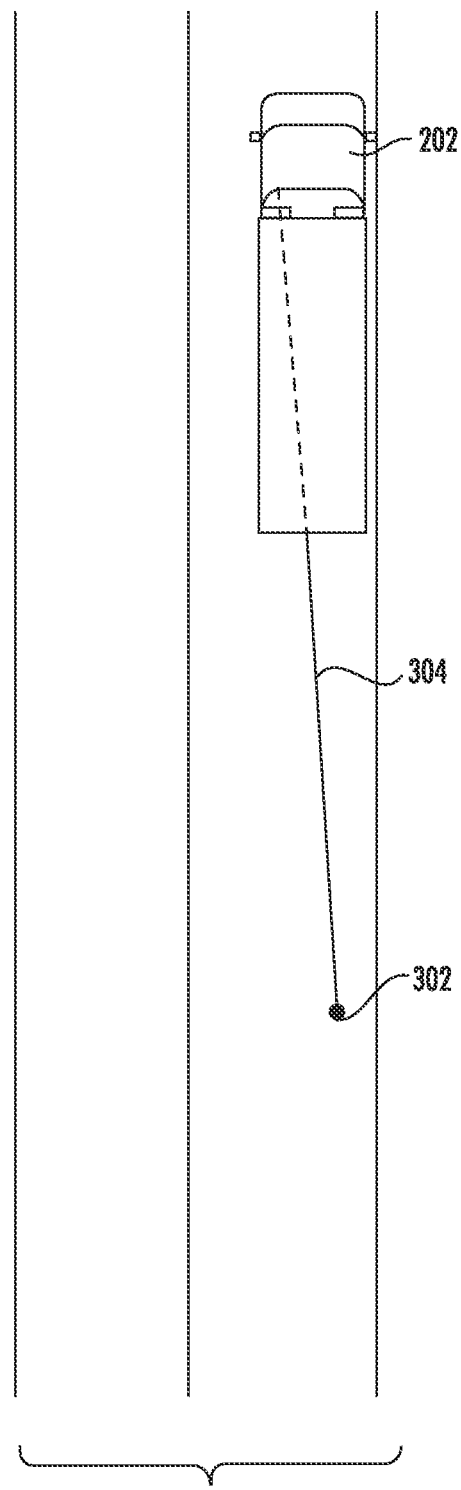
FIG. 3 depicts an autonomous vehicle after deployment of a warning device according to example embodiments of the present disclosure.

FIG. 2 depicts an autonomous vehicle 202 moving in a travel way, such as a travel lane 204 of the travel way before beginning deployment of warning device(s) according to example embodiments of the present disclosure. As illustrated in FIG. 2, an autonomous vehicle 202 (e.g. an autonomous truck, etc.) may be traveling in a travel way (e.g., within travel lane 204) according to a defined trajectory, for example, trajectory 206, as part of a vehicle motion plan. The autonomous vehicle 202 (e.g., vehicle computing system, etc.) may detect a fault condition that necessitates stopping the motion of the autonomous vehicle 202. For instance, the autonomous vehicle 202 may determine the existence of a fault condition by monitoring one or more vehicle parameters, such as fuel level, charge level, engine conditions, tire pressure, available data storage in the on-board memory devices, and/or other health and maintenance data of the autonomous vehicle, and comparing the parameters to one or more thresholds. As one example, the autonomous vehicle 202 may determine that a fault condition exists when the engine temperature exceeds a pre-set temperature threshold. The autonomous vehicle 202 (e.g., vehicle computing system, etc.) may determine a vehicle stop maneuver (e.g., stop trajectory 208 and deceleration rate, stop motion plan, etc.) to bring the autonomous vehicle 202 to a safe stop (as depicted in FIG. 3). In some implementations, upon determining that a vehicle stop maneuver will be implemented (e.g., obtaining data indicative of a vehicle stop maneuver), the autonomous vehicle 202 (e.g., vehicle computing system, etc.) can determine if one or more warning devices should be deployed and determine a maneuver for dispensing one or more warning devices to increase visibility of the stopped vehicle to approaching traffic.

FIG. 3 depicts an autonomous vehicle 202 after deployment of a warning device according to example embodiments of the present disclosure. As illustrated in FIG. 3, upon determining that a vehicle stop maneuver will be implemented, an autonomous vehicle 202 can determine whether to deploy one or more warning devices based on the detected fault, motion plan, vehicle trajectory, vehicle parameters (e.g., vehicle speed, etc.), environment conditions (e.g., location and trajectories of nearby traffic, objects in the surrounding environment, weather, time of day, road conditions, etc.) and/or the like. The autonomous vehicle 202 can determine an appropriate deployment maneuver to dispense warning device(s) (e.g., safety flares, safety triangles, cable or wire devices that include lights and/or LEDs, rope lights, and/or the like) during the vehicle stop maneuver. For example, the autonomous vehicle 202 (e.g., vehicle computing system, etc.) may determine a deployment maneuver including the timing and/or positioning for dispersing the warning device(s) 304, the release rate of the warning device(s) 304, and/or the like. The autonomous vehicle 202 (e.g., vehicle computing system, etc.) can determine how the warning device(s) 304 should be dispensed based in part on a motion plan and/or stop trajectory (e.g., stop trajectory 208), vehicle speed, map data, sensor data, environment conditions (e.g., location and trajectories of nearby traffic, objects in the surrounding environment, weather, time of day, road conditions, etc.), and/or the like. The autonomous vehicle 202 (e.g., vehicle computing system, etc.) can provide command signal(s) to one or more vehicle systems to perform the deployment maneuver (e.g., to trigger actuators to dispense the warning device(s) 304, etc.). As an example, the autonomous vehicle 202 (e.g., vehicle computing system, etc.) can initiate the dispersing of the warning device(s) 304 at start point 302, such that the dispensing of the warning device(s) 304 begins at a point in time when the vehicle 202 is a certain distance from stopping, to provide a warning of the stopped vehicle 202 to approaching traffic.

In some implementations, the vehicle computing system can adjust the stop trajectory 208 to affect positioning of the warning device(s) 304. For example, the vehicle computing system can take parameters, such as road elevation, road conditions, surface characteristics (e.g., friction, sliding, etc.), device characteristics, and/or the like, into account to determine or adjust the stop trajectory 208 and dispensing of the warning device(s) 304 to affect positioning of the warning device(s) 304 and/or increase visibility of the warning device(s) 304.

In some implementations, the warning device(s) 304 can be attached together (e.g., by cable, wire, etc.) to allow for easier retrieval and can stay connected to the autonomous vehicle 202 after the warning device(s) 304 are dispensed. In one example, as illustrated in FIG. 3, the warning device(s) 304 can include a spool of wire with attached flashing LEDs positioned onboard the autonomous vehicle 202, and can include a weighting mechanism to allow for unspooling the wire for deployment of the warning device(s) 304. In some implementations, the spool of wire can have a predetermined length that can be fully released or released proportional to the speed of the autonomous vehicle 202 and can be deployed in a manner that provides for directing traffic around the stopped autonomous vehicle 202.

In some implementations, as shown in FIG. 3, the autonomous vehicle 202 may be a tractor-trailer truck and the warning device(s) 304 may be positioned on the tractor portion of the autonomous vehicle 202. In such implementations, the warning device(s) 304 may be configured such that the trailer portion of the truck can drive over the warning device(s) 304.

In some implementations, the autonomous vehicle 202 (e.g., vehicle computing system, etc.) can provide for performing one or more actions to alert other vehicles (e.g., vehicle operators) that the warning device(s) 304 is to be deployed. For example, in some implementations, the vehicle computing system can communicate commands to one or more vehicle systems to activate and/or modify lights and/or displays (e.g., hazard warning lights, brake lights, other displays, etc.) to more prominently alert other vehicles (and/or associated operators) following the autonomous vehicle 202 of the warning device(s) 304 being dispensed. In some implementations, the vehicle computing system may perceive objects (e.g., other vehicles) proximate to the autonomous vehicle 202 (e.g., approaching the vehicle from behind, etc.) and activate lights and/or modify a light blink pattern to alert the approaching drivers.

Figure 5:
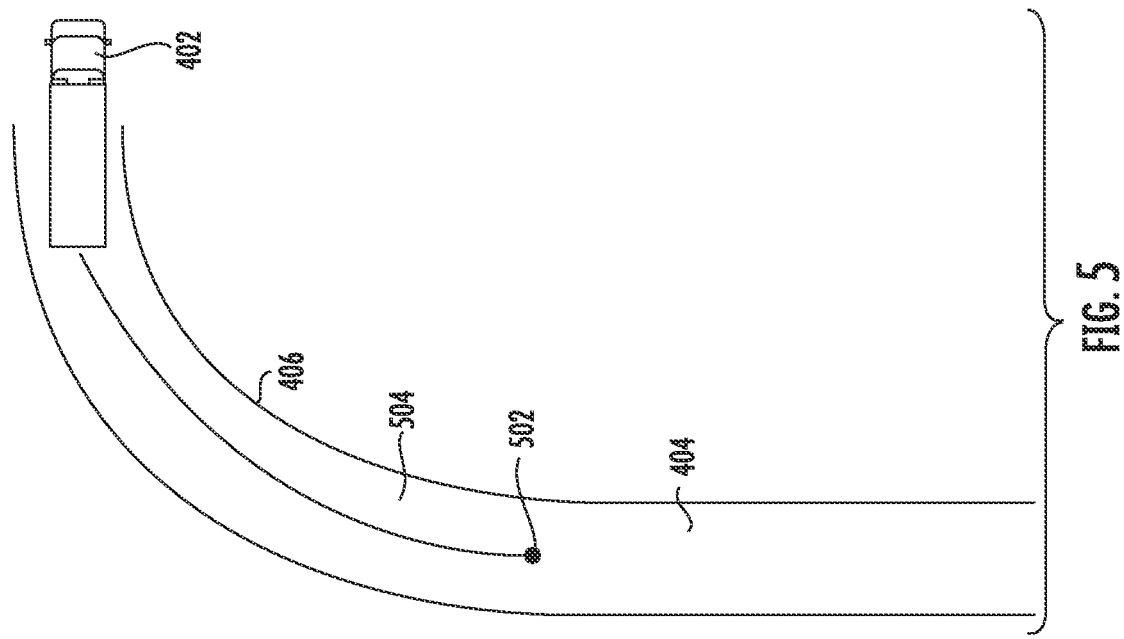
FIG. 5 depicts an autonomous vehicle after deployment of a warning device according to example embodiments of the present disclosure.
Figure 4:
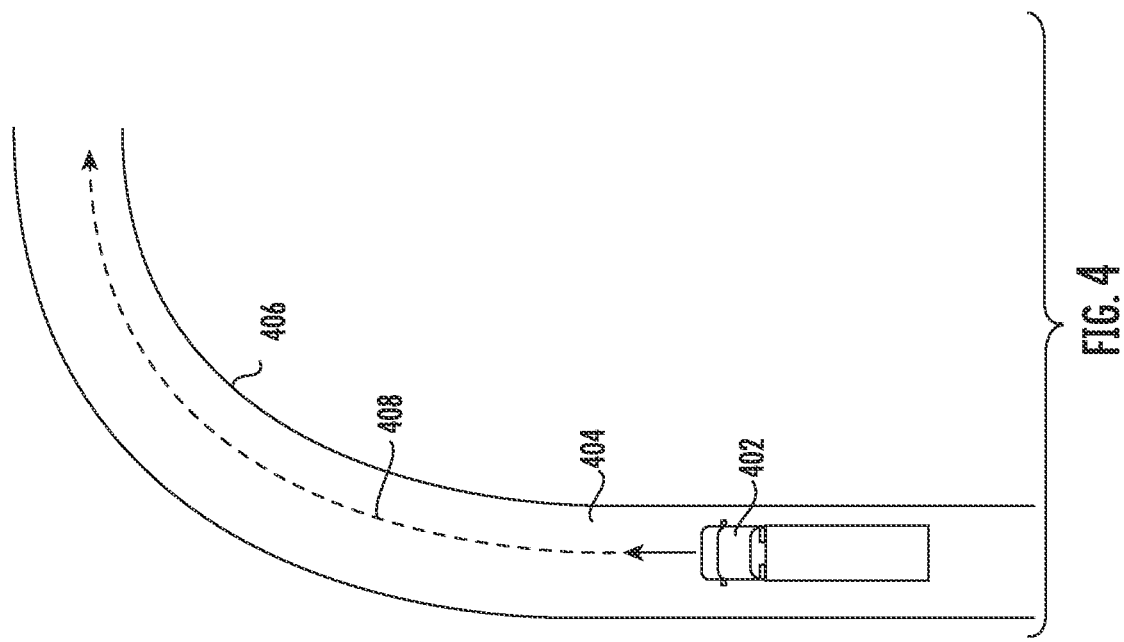
FIG. 4 depicts an autonomous vehicle moving in a travel lane before beginning deployment of warning device(s) according to example embodiments of the present disclosure.

FIG. 4 depicts an autonomous vehicle 402 moving in a travel way (in travel lane 404) before beginning deployment of warning device(s) according to example embodiments of the present disclosure. As illustrated in FIG. 4, an autonomous vehicle 402 may be traveling in the travel way (e.g., in travel lane 404) according to a defined trajectory as part of a vehicle motion plan and may be approaching a curve 406 in the travel lane 404. The autonomous vehicle 402 (e.g., vehicle computing system, etc.) may detect a fault condition that necessitates stopping the motion of the autonomous vehicle 402. The autonomous vehicle 402 (e.g., vehicle computing system, etc.) may determine a vehicle stop maneuver (e.g., stop trajectory 408 and deceleration rate, stop motion plan, etc.) to bring the autonomous vehicle 402 to a safe stop. In some cases, the vehicle stop maneuver may necessitate bringing the vehicle 402 to a stop while in or near the curve 406 of the travel lane 404 (as depicted in FIG. 5). Upon determining that a vehicle stop maneuver will be implemented, the autonomous vehicle 402 (e.g., vehicle computing system, etc.) can determine if one or more warning devices should be deployed and can determine a maneuver for dispensing one or more warning devices to increase visibility of the stopped vehicle to approaching traffic.

FIG. 5 depicts an autonomous vehicle 402 after deployment of warning device(s) according to example embodiments of the present disclosure. As illustrated in FIG. 5, upon determining that a vehicle stop maneuver will be implemented the autonomous vehicle 402 can determine whether to deploy one or more warning devices based on the detected fault, motion plan, vehicle trajectory, vehicle conditions (e.g., vehicle speed, etc.), environment conditions (e.g., location and trajectories of nearby traffic, objects in the surrounding environment, weather, time of day, road conditions, etc.) and/or the like. The autonomous vehicle 402 may determine that the vehicle will stop in or near a curve of the travel lane (e.g., curve 406). For example, the autonomous vehicle 402 (e.g., vehicle computing device, etc.) may determine that the travel lane 404 includes a curve 406 (e.g., based on map data and/or sensor data, etc.) The autonomous vehicle 402 may determine an appropriate deployment maneuver to dispense warning device(s) 504 should begin prior to entering the curve 406 in the travel lane 404, for example, at a starting position 502, to provide increased visibility of the warning device(s) 504 and warn approaching traffic of the stopped vehicle.

In some implementation, the autonomous vehicle 402 can control the placement of the warning device(s) 504 during and/or after they have been dispensed. As one example, the warning device(s) 504 may include a spool of an inflatable line that when inflated has a predetermined shape. As such, during operation, the autonomous vehicle 402 can inflate the line to achieve the predetermined shape, such that the inflated shape provides for proper placement of the warning device(s) 504 behind the vehicle (e.g., along the curve 406). Additionally or alternatively, the autonomous vehicle 402 can include an outrigger structure that moves the proximal end of the warning device line in a way to achieve a desired positioning of the warning device(s) 504 (e.g., desired shape of the released line).

Figure 6:
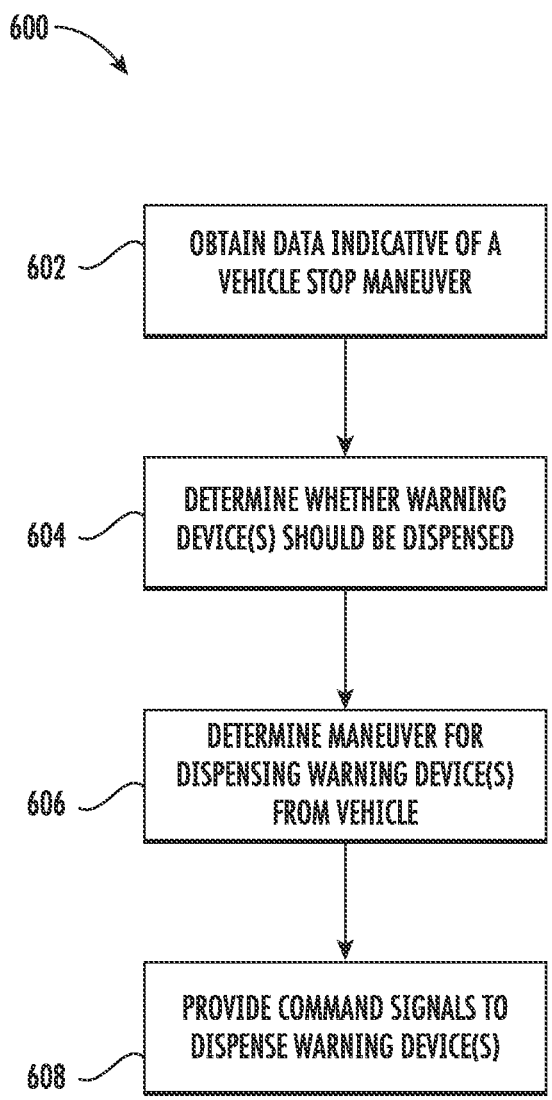
FIG. 6 depicts a flowchart diagram of example operations for dispensing warning device(s) for an autonomous vehicle according to example embodiments of the present disclosure.

FIG. 6 depicts a flowchart diagram of example operations 600 for dispensing warning device(s) for an autonomous vehicle according to example embodiments of the present disclosure. One or more portion(s) of the operations 600 can be implemented by one or more computing devices such as, for example, the vehicle computing system 106 of FIG. 1, the vehicle computing system 106 or remote computing system 130/720 of FIGS. 1 and 7, and/or the like. Each respective portion of the operations 600 can be performed by any (or any combination) of the one or more computing devices. Moreover, one or more portion(s) of the operations 600 can be implemented as an algorithm on the hardware components of the device(s) described herein (e.g., as in FIGS. 1 and 7), for example, to provide for dispensing warning device(s) for an autonomous vehicle. FIG. 6 depicts elements performed in a particular order for purposes of illustration and discussion and is not meant to be limiting.

At 602, one or more computing devices included within a computing system (e.g., computing system 106, 130, 720, and/or the like) can obtain data indicative of a vehicle stop maneuver. For example, a vehicle computing system 106 can communicate with various vehicle systems onboard the autonomous vehicle (e.g., autonomous vehicle 102, 202, 402) and obtain data indicative of one or more parameters associated with the vehicle. The vehicle computing system 106 can determine the existence of a fault associated with the vehicle, for example, based in part on such parameter data. To address the existence of the fault, the vehicle computing system 106 can determine one or more actions to be performed by the autonomous vehicle to stop of the motion of the vehicle (e.g., a vehicle stop maneuver).

At 604, the computing system 106, 130, 720 can determine whether one or more warning devices (e.g., warning device(s) 304, 504) should be dispensed in conjunction with the vehicle stop maneuver. For example, the computing system 106, 130, 720 can determine whether the autonomous vehicle is to deploy one or more warning devices 304, 504 based on the detected fault, parameters of the vehicle (e.g., vehicle speed, etc.), the stop trajectory of the vehicle, environment conditions (e.g., location and trajectories of nearby traffic, weather, time of day, road conditions, etc.), and/or the like.

At 606, upon determining that the warning device(s) 304, 504 should be deployed during the vehicle stop maneuver, the computing system 106, 130, 720 can determine a deployment maneuver for dispensing the warning device(s) 304, 504 from the vehicle. For example, the computing system 106, 130, 720 can determine a deployment maneuver based on the stop trajectory (e.g., stop trajectory 208, 408), for example, to enable the autonomous vehicle to dispense the warning device(s) 304, 504 in a manner that increases the visibility of the warning device(s) 304, 504. The computing system 106, 130, 720 can determine aspects of the deployment maneuver including timing the deployment and/or determining the rate of release of the warning device(s) 304, 504 based on the stopping distance of the vehicle, stopping trajectory, vehicle speed, map data, sensor data, environment, and/or the like. Additionally, in some cases, the computing system 106, 130, 720 can determine and/or modify the stop trajectory for the vehicle (e.g., as part of the vehicle stop maneuver) to affect the positioning of the warning device(s) 304, 504, for example, by taking into account road elevation, surface characteristics (e.g., friction, sliding, etc.), device characteristics, road conditions, map data, sensor data, and/or the like.

At 608, the computing system 106, 130, 720 can provide one or more command signals to control system(s) onboard or associated with the vehicle to control dispensing of the warning device(s) 304, 504. For example, in some implementations, command signal(s) can be provided to one or more actuators to release warning device(s) 304, 504, such as flares, safety triangles, cones, lights, and/or the like, according to a defined deployment maneuver. As another example, command signal(s) can be provided to one or more actuators to begin unspooling a wire or cable including LED lights and to activate the LED lights upon deployment. Additionally, in some implementations, the computing system 106, 130, 720 can provide command signal(s) to one or more vehicle systems to activate and/or modify lights and/or displays (e.g., hazard warning lights, brake lights, other displays, etc.) to more prominently alert other vehicles following the autonomous vehicle of the warning device(s) 304, 504 being dispensed.

Figure 7:
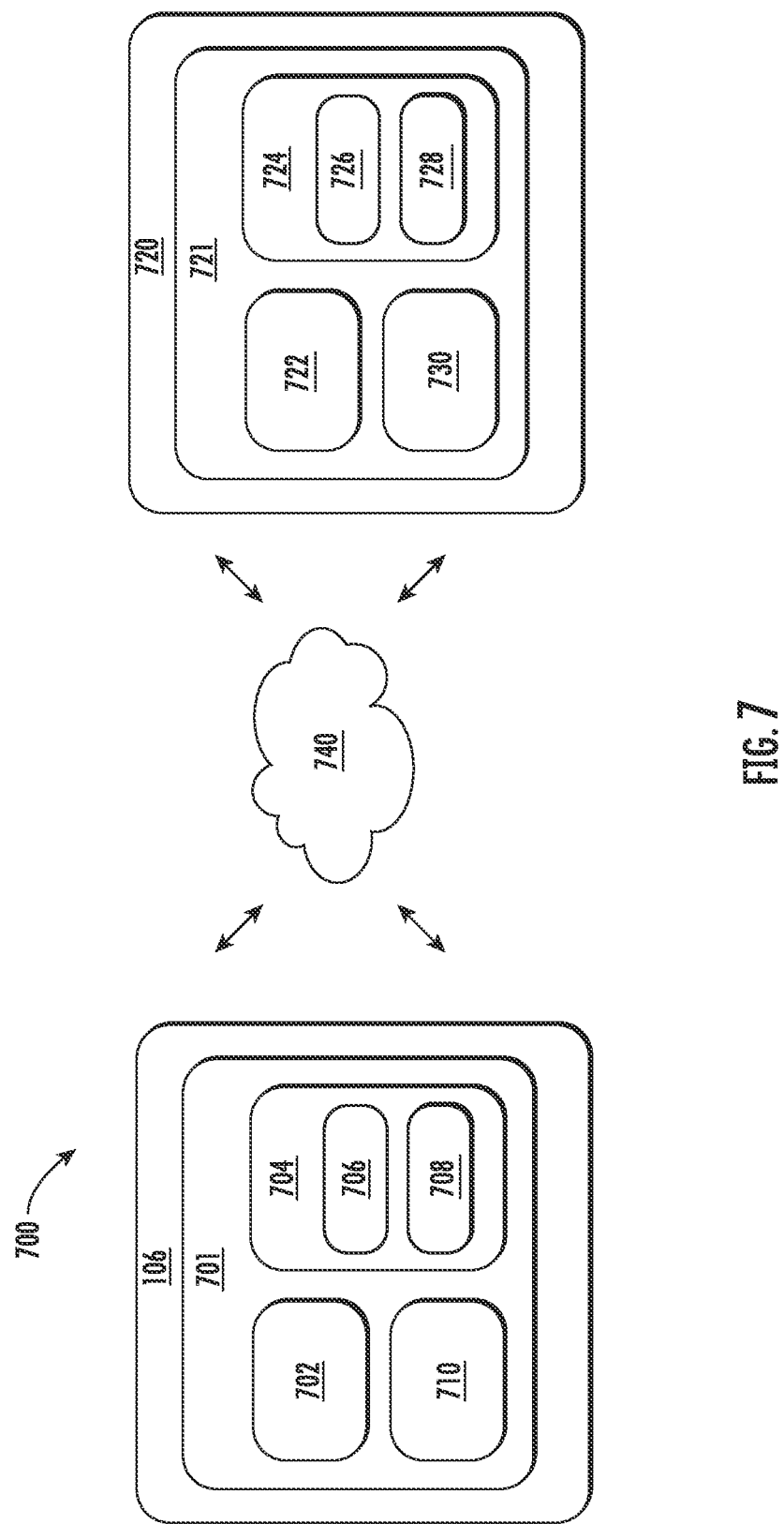
FIG. 7 depicts a block diagram of an example computing system according to example embodiments of the present disclosure.

FIG. 7 depicts a block diagram of an example computing system 700 according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include the vehicle computing system 106 of the autonomous vehicle 102 and a remote computing system 720 (e.g., operations computing system, etc. that is remote from the vehicle 102) that can be communicatively coupled to one another over one or more network(s) 740. The remote computing system 720 can be associated with a central operations system and/or an entity associated with the vehicle 102 such as, for example, a vehicle owner, vehicle manager, fleet operator, service provider, etc. For instance, the remote computing system 720 can be or otherwise include the remote computing system 130 described herein.

The computing device(s) 701 of the vehicle computing system 106 can include processor(s) 702 and at least one memory 704. The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, magnetic disks, data registers, etc., and combinations thereof.

The memory 704 can store information that can be accessed by the one or more processors 702. For instance, the memory 704 (e.g., one or more non-transitory computer-readable storage mediums, memory devices) can include computer-readable instructions 706 that can be executed by the one or more processors 702. The instructions 706 can be software written in any suitable programming language or can be implemented in hardware. Additionally, or alternatively, the instructions 706 can be executed in logically and/or virtually separate threads on processor(s) 702.

For example, the memory 704 on-board the vehicle 102 can store instructions 706 that when executed by the one or more processors 702 cause the one or more processors 702 (e.g., in the vehicle computing system 106) to perform operations such as any of the operations and functions of the computing device(s) 701 and/or vehicle computing system 106, the operations and functions for deploying warning device(s) (e.g., one or more portions of operations 600), any of the operations and functions for which the vehicle computing system 106 is configured, and/or any other operations and functions of the vehicle computing system 106, as described herein.

The memory 704 can store data 708 that can be obtained (e.g., received, accessed, written, manipulated, created, generated, etc.) and/or stored. The data 708 can include, for instance, service data (e.g., trip data, etc.), sensor data, map data, perception data, prediction data, motion planning data, object states and/or state data, object motion trajectories, feedback data, fault data, and/or other data/information as described herein. In some implementations, the computing device(s) 701 can obtain data from one or more memories that are remote from the vehicle 102.

The computing device(s) 701 can also include a communication interface 710 used to communicate with one or more other system(s) (e.g., remote computing system 720). The communication interface 710 can include any circuits, components, software, etc. for communicating via one or more networks (e.g., network(s) 740). In some implementations, the communication interface 710 can include, for example, one or more of a communications controller, receiver, transceiver, transmitter, port, conductors, software, and/or hardware for communicating data.

The remote computing system 720 can include one or more computing device(s) 721. The computing device(s) 721 can include one or more processors 722 and at least one memory 724. The one or more processors 722 can be any suitable processing device (e.g., a processor core, a microprocessor, an ASIC, a FPGA, a controller, a microcontroller, etc.) and can be one processor or a plurality of processors that are operatively connected. The memory 724 can include one or more tangible, non-transitory computer-readable storage media, such as RAM, ROM, EEPROM, EPROM, one or more memory devices, flash memory devices, data registers, etc., and combinations thereof.

The memory 724 can store information that can be accessed by the one or more processors 722. For instance, the memory 724 (e.g., one or more tangible, non-transitory computer-readable storage media, one or more memory devices, etc.) can include computer-readable instructions 726 that can be executed by the one or more processors 722. The instructions 726 can be software written in any suitable programming language or can be implemented in hardware. Additionally, or alternatively, the instructions 726 can be executed in logically and/or virtually separate threads on processor(s) 722.

For example, the memory 724 can store instructions 726 that when executed by the one or more processors 722 cause the one or more processors 722 to perform operations such as any of the operations and functions of the remote computing system 720 and/or computing device(s) 721 or for which the remote computing system 720 is configured, as described herein, and/or any other operations and functions described herein.

The memory 724 can store data 728 that can be obtained and/or stored. The data 728 can include, for instance, service data (e.g., trip data, etc.), data associated with autonomous vehicles (e.g., sensor data, map data, perception data, prediction data, motion planning data, object states and/or state data, object motion trajectories, feedback data, fault data, etc.), and/or other data/information as described herein. In some implementations, the computing device(s) 721 can obtain data from one or more memories that are remote from the remote computing system 720.

The computing device(s) 721 can also include a communication interface 730 used to communicate with one or more other system(s) (e.g., the vehicle computing system 106, etc.). The communication interface 730 can include any circuits, components, software, etc. for communicating via one or more networks (e.g., network(s) 740). In some implementations, the communication interface 730 can include, for example, one or more of a communications controller, receiver, transceiver, transmitter, port, conductors, software, and/or hardware for communicating data.

The network(s) 740 can be any type of network or combination of networks that allows for communication between devices. In some embodiments, the network(s) 740 can include one or more of a local area network, wide area network, the Internet, secure network, cellular network, mesh network, peer-to-peer communication link, and/or some combination thereof, and can include any number of wired or wireless links. Communication over the network(s) 740 can be accomplished, for instance, via a communication interface using any type of protocol, protection scheme, encoding, format, packaging, etc.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method comprising:
   obtaining data indicative of a vehicle stop maneuver for an autonomous vehicle, wherein the autonomous vehicle is an autonomous truck comprising a tractor portion;
   obtaining map data associated with the vehicle stop maneuver, the map data comprising information indicative of at least one of (i) a road elevation or (i) a road curvature;
   based on the data indicative of the vehicle stop maneuver and the map data, identifying a warning device of the autonomous vehicle for deployment, wherein the warning device is physically connected to the tractor portion;

determining a predicted trajectory of one or more vehicles within a surrounding environment of the autonomous vehicle;

determining a timing and a position for physically moving the warning device from the autonomous vehicle based on the predicted trajectory of the one or more vehicles within the surrounding environment of the autonomous vehicle and at least one of (i) the road elevation or (ii) the road curvature; and providing one or more signals to initiate the physical movement of the warning device of the autonomous vehicle in accordance with the timing and the position, wherein the warning device remains physically connected to the tractor portion while deployed.

2. The computer-implemented method of claim 1, wherein the data indicating the vehicle stop maneuver indicates that (i) the vehicle stop maneuver has been performed, (ii) is currently being performed, or (iii) is to be performed by the autonomous vehicle.

3. The computer-implemented method of claim 1, wherein the warning device comprises a triangular shape.

4. The computer-implemented method of claim 1, wherein the position for placing the warning device is a position that is visible by approaching traffic.

5. The computer-implemented method of claim 1, wherein the warning device is physically connected to the tractor portion through an actuator configured to deploy the warning device.

6. The computer-implemented method of claim 1, wherein the deployment of the warning device of the autonomous vehicle is initiated in response to the autonomous vehicle performing the vehicle stop maneuver.

7. The computer-implemented method of claim 1, wherein the deployment of the warning device of the autonomous vehicle is initiated after the autonomous vehicle performs the vehicle stop maneuver.

8. The computer-implemented method of claim 1, further comprising:

providing a signal to activate a hazard warning light of the autonomous vehicle.

9. A vehicle control system comprising:

one or more processors; and a memory including instructions that are executable by the one or more processors to cause the one or more processors to perform operations, the operations comprising:

obtaining data indicative of a vehicle stop maneuver for an autonomous vehicle, wherein the autonomous vehicle is an autonomous truck comprising a tractor portion;

obtaining map data associated with the vehicle stop maneuver, the map data comprising information indicative of at least one of (i) a road elevation or (i) a road curvature;

based on the data indicative of the vehicle stop maneuver and the map data, identifying a warning device of the autonomous vehicle for deployment, wherein the warning device is physically connected to the tractor portion;

determining a predicted trajectory of one or more vehicles within a surrounding environment of the autonomous vehicle;

determining a timing and a position for physically moving the warning device from the autonomous vehicle based on the predicted trajectory of the one or more vehicles within the surrounding environment of the autonomous vehicle and at least one of (i) the road elevation or (ii) the road curvature; and providing one or more signals to initiate the physical movement of the warning device of the autonomous vehicle in accordance with the timing and the position, wherein the warning device remains physically connected to the tractor portion while deployed.

10. The vehicle control system of claim 9, wherein the data indicating the vehicle stop maneuver indicates that (i) the vehicle stop maneuver has been performed, (ii) is currently being performed, or (iii) is to be performed by the autonomous vehicle.

11. The vehicle control system of claim 9, wherein the warning device comprises a triangular shape.

12. The vehicle control system of claim 9, wherein the position for placing the warning device is a position that is visible by approaching traffic.

13. The vehicle control system of claim 9, wherein the deployment of the warning device of the autonomous vehicle is initiated after the autonomous vehicle performs the vehicle stop maneuver.

14. The vehicle control system of claim 9, wherein the warning device comprises a light.

15. The vehicle control system of claim 9, wherein the warning device is not visible to a surrounding environment of the autonomous vehicle before deployment of the warning device.

16. The vehicle control system of claim 9, wherein the position for deploying the warning device is a position that is visible by approaching traffic.

17. The vehicle control system of claim 9, wherein the warning device is physically connected to the tractor portion through an actuator configured to deploy the warning device.

18. An autonomous truck comprising:

a tractor portion;

a warning device physically connected to the tractor portion; and a control system comprising one or more processors configured to:

obtain data indicative of a vehicle stop maneuver for the autonomous truck;

obtaining map data associated with the vehicle stop maneuver, the map data comprising information indicative of at least one of (i) a road elevation or (i) a road curvature;

based on the data indicative of the vehicle stop maneuver and the map data, identifying a warning device of the autonomous truck for deployment;

determine a predicted trajectory of one or more vehicles within a surrounding environment of the autonomous truck;

determine a timing and a position for physically moving the warning device from the autonomous truck based on the predicted trajectory of the one or more vehicles within the surrounding environment of the autonomous truck and at least one of (i) the road elevation or (ii) the road curvature; and provide one or more command signals to initiate the physical movement of the warning device of the autonomous truck in accordance with the timing and the position, wherein the warning device remains physically connected to the tractor portion while deployed.

19. The autonomous truck of claim 18, wherein the vehicle stop maneuver comprises a deceleration and a stop of the autonomous truck, wherein the deployment of the warning device of the autonomous truck is initiated during the deceleration or after the stop of the autonomous truck.

20. The computer-implemented method of claim 1, wherein map data comprises at least one of:
(i) an identity of one or more structures;
(ii) a location of one or more structures;
(iii) a location of traffic lanes;
(iv) a direction of traffic lanes;
(v) a location and instructions of traffic signage; or
(vi) traffic control data indicative of at a least one or more traffic signals.

* * * * *